United States Patent
Chen

[19]

[11] Patent Number: 6,115,758
[45] Date of Patent: Sep. 5, 2000

[54] SLOT CONTROL SYSTEM WITH FIXED SEQUENCE AND DYNAMIC SLOT EFFECT UTILIZING SLOT PROCESSOR FOR CONTINUOUSLY DETECTING OPERATION REQUEST SIGNAL AND IMMEDIATELY ALLOWING NEXT PORT OR BLOCK OPERATION WHEN NO OPERATION REQUEST SIGNAL

[75] Inventor: Aphrodite Chen, Hsinchu, Taiwan

[73] Assignee: Accton Technology Corporation, Hsinchu, Taiwan

[21] Appl. No.: 09/174,323

[22] Filed: Oct. 19, 1998

[51] Int. Cl.[7] .............................. G06F 13/14; G06F 13/20
[52] U.S. Cl. ................................. 710/36; 710/39; 710/41; 710/44; 710/131; 712/229; 712/245; 709/213; 709/229
[58] Field of Search ............................. 710/36, 131, 39, 710/41, 44; 712/229, 245; 709/213, 229

[56] References Cited

U.S. PATENT DOCUMENTS

| 4,791,629 | 12/1988 | Burns et al. | 370/85 |
| 5,012,469 | 4/1991 | Sardana | 370/95.3 |
| 5,276,703 | 1/1994 | Budin et al. | 375/1 |
| 5,841,773 | 11/1998 | Jones | 370/395 |

*Primary Examiner*—Thomas C. Lee
*Assistant Examiner*—Rehana Perveen
*Attorney, Agent, or Firm*—Rosenberg, Klein & Lee

[57] ABSTRACT

The present invention relates to a slot control method of a multi-port network switch and a switch structure therefor. More particularly, the present invention relates to a slot control method of a shared memory structure with a fixed sequence and a dynamic slot effect. According to the present invention, a slot processor is provided in a slot controller of a network switch for controlling and sequentially allowing a plurality of transportation ports connected to the slot controller to perform data transmission in a fixed round-robin manner while a maximum allowable slot time is set. The slot controller continuously detects whether active transportation port sends an operation request signal or whether the maximum allowable slot time is exceeded. If there is no operation request signal or the allowable slot time is exceeded, data transmission of the next transportation port is allowed and performed immediately, thereby reducing the packet latency. Further, according to the present invention, alternatively, transportation ports of low priority are distributed to operate in several cycles. Therefore, even in the case of using DRAMs, a data bus for SRAMs can achieve full line speed and be efficiently utilized.

19 Claims, 8 Drawing Sheets

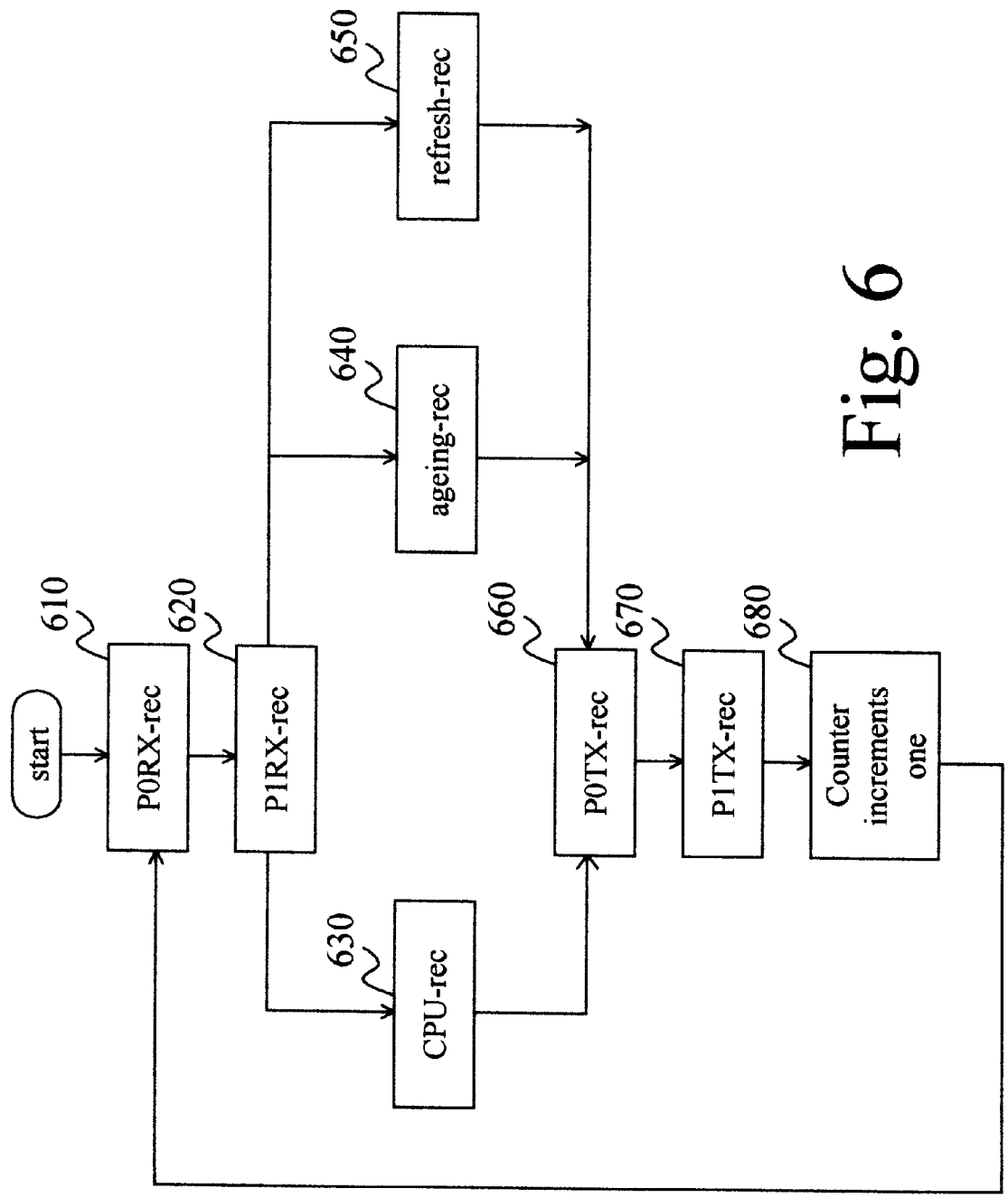

SLOT CONTROL SYSTEM WITH FIXED SEQUENCE AND DYNAMIC SLOT EFFECT UTILIZING SLOT PROCESSOR FOR CONTINUOUSLY DETECTING OPERATION REQUEST SIGNAL AND IMMEDIATELY ALLOWING NEXT PORT OR BLOCK OPERATION WHEN NO OPERATION REQUEST SIGNAL

BACKGROUND OF THE INVENTION

1. Field of the Invention

The present invention relates to a slot control method of a multi-port network switch and a switch structure therefor. More particularly, the present invention relates to a slot control method of a shared memory structure with a fixed sequence and a dynamic slot effect.

2. Description of the Prior Art

Recently, Internet has become wildly popular due to fast communication, exemption of limitation in time or space, and capability of processing a lot of data. Accordingly, various network protocols and commercialized products are developed. Ethernet is promising since it is low in cost, simple in assembly, easy in management and convenient for training. Therefore, a multi-port Ethernet switch for connecting a plurality of Ethernet architectures is significant.

As shown in FIG. 1, a conventional multi-port Ethernet switch 10 is a network switch of a distributed structure in which a switch fabric 19 for transmitting data packets is connected to a plurality of transportation ports 11,13 and 15. Each of the transportation ports 11, 13 and 15 is coupled to an input packet buffer 117 for receiving data packets from a network interface and transmitting the data packets to the switch fabric 19, an output packet buffer 113 for receiving data packets from the switch fabric 19 and transmitting the data packets to a network interface, and a routing table 115 for registering other address data. Since such a distributed network switch 10 has to be provided with at least three independent memory ICs, it is difficult in manufacture and high in cost, although a considerable bandwidth is provided.

In view of the above shortcomings of the distributed multi-port network switch, as shown in FIG. 2, another multi-port network switch 20 having a shared memory structure is proposed. In such a structure, the packet buffers 113 and 117 and the routing table 115 mentioned above are integrated in a shared memory 29 as a packet buffer 293 and a routing table 295, both of which can be shared among multiple ports, so that the occupied space and the memory capacity needed are decreased, thereby reducing the manufacture cost. Each of the transportation port 21, 23 an 25 is divided into RX DMA 211, RX FIFO 215 and RX MAC 213 for performing data packet transmission to the shared memory 29, and corresponding TX DMA 217, TX FIFO 219 and TX MAC 218 for retrieving data packets from the shared memory 29. In addition, if the shared memory 29 consists of a DRAM of a larger memory capacity, since the DRAM uses capacitors to store data, signal for refreshing data stored in the routing table 295 and the shared memory 29 should be supplied in the network switch 20 by function block memory refresh 28. The other, function blocks such as routing table ageing 24 is use for routing table maintain, CPU interface control 26 is for CPU access switch registers and shared memory 29.

Only one memory (i.e., the shared memory 29) is used in the multi-port network switch of the shared memory structure to serve a plurality of transportation ports and function blocks, and thus how to coordinate the transportation ports and the function blocks with a limited bandwidth is very important. Therefore, a slot controller 27 and a memory interface control 279 are provided in the multi-port network switch having the shared memory to control operations of the transportation ports or the function blocks.

Arbitration is one of the transmission sequence control methods adopted by the slot controller 2. As shown in FIG. 2, when one of the transportation ports sends a transmission request signal, the request may be allowed only after other transmission operations which have been allowed are completed. Accordingly, almost every transportation port or function block has to wait a longer time, resulting in packet latency and data underrun or data overflow. Also, many internal FIFOs are needed and the whole transmission period cannot be handled. Further, the possibility of allowing transmission for each of the transportation ports is not equal.

To improve the disadvantageous slot control method using arbitration, a round-robin processor 275 is additionally provided. As shown in FIGS. 2 and 2A, priority for the last-allowed function block or transportation port is lowest to maintain transmission equality in the network. However, such a way cannot effectively solve the problems of difficulty in handling the whole period, requirement of many internal FIFOs and packet latency.

To this end, another slot control method for use in a multi-port network switch of a shared memory structure is proposed. Concepts of a fixed slot sequence and a fixed slot time are introduced so that transportation ports sequentially operate and each of the allowed operations corresponds to a respective slot time. When the current slot time expires, the next transportation port or function block operates immediately. Although the slot control method can achieve network equality and handle the execution period, it still suffers from the following problem. Since the transportation ports each has a respective fixed slot time, if a specified transportation port or function block does not send a request signal, or only few data are transmitted and a slot time is not fully utilized, the network switch still has to wait until the slot time expires. Therefore, many slot times are wasted so that the phenomenon of packet latency cannot be effectively overcome and the necessary number of the internal FIFOs cannot be decreased.

Therefore, it is desired to propose a method to maintain network equality with a fixed sequence while randomly detect the slot operation to effectively decrease the packet latency or decrease internal FIFOs to be used in order to reduce the cost. Even in the case of using DRAMs, a data bus for SRAMs can achieve fill line speed and be efficiently utilized.

SUMMARY OF THE INVENTION

Therefore, an object of the present invention is to provide a slot control method with a fixed sequence and a dynamic slot effect in which each transportation port or function block has the same possibility of reading data from a memory, and any active transportation port or function block can be duly deactivated on the basis of data transmission condition to activate the next transportation port or function block, thereby reducing the packet latency.

Another object of the present invention is to provide a slot control method with a fixed sequence and a dynamic slot effect in which any active transportation port or function block can be duly deactivated on the basis of data transmission condition to active the next transportation port or function block, thereby reducing the packet latency and the necessary internal FIFOs to save cost and space.

A further object of the present invention is to provide a slot control method with a fixed sequence and a dynamic slot effect in which a plurality of function blocks of low priority are split in different cycles so that even in the case of using DRAMs, a data bus for SRAMs can achieve full line speed and be efficiently utilized.

These and other objects, features and advantages of the present invention will become apparent to those skilled in the art upon consideration of the following description of the preferred embodiments of the present invention taken in conjunction with the accompanying drawings

BRIEF DESCRIPTION OF THE DRAWINGS

FIG. 6 is a flow chart of operations of the slot controller shown in FIG. 5.

DETAILED DESCRIPTION OF THE PREFERRED EMBODIMENTS

The following description will be made to the preferred embodiments of the present invention with reference to the accompanying drawings.

Figure 1:
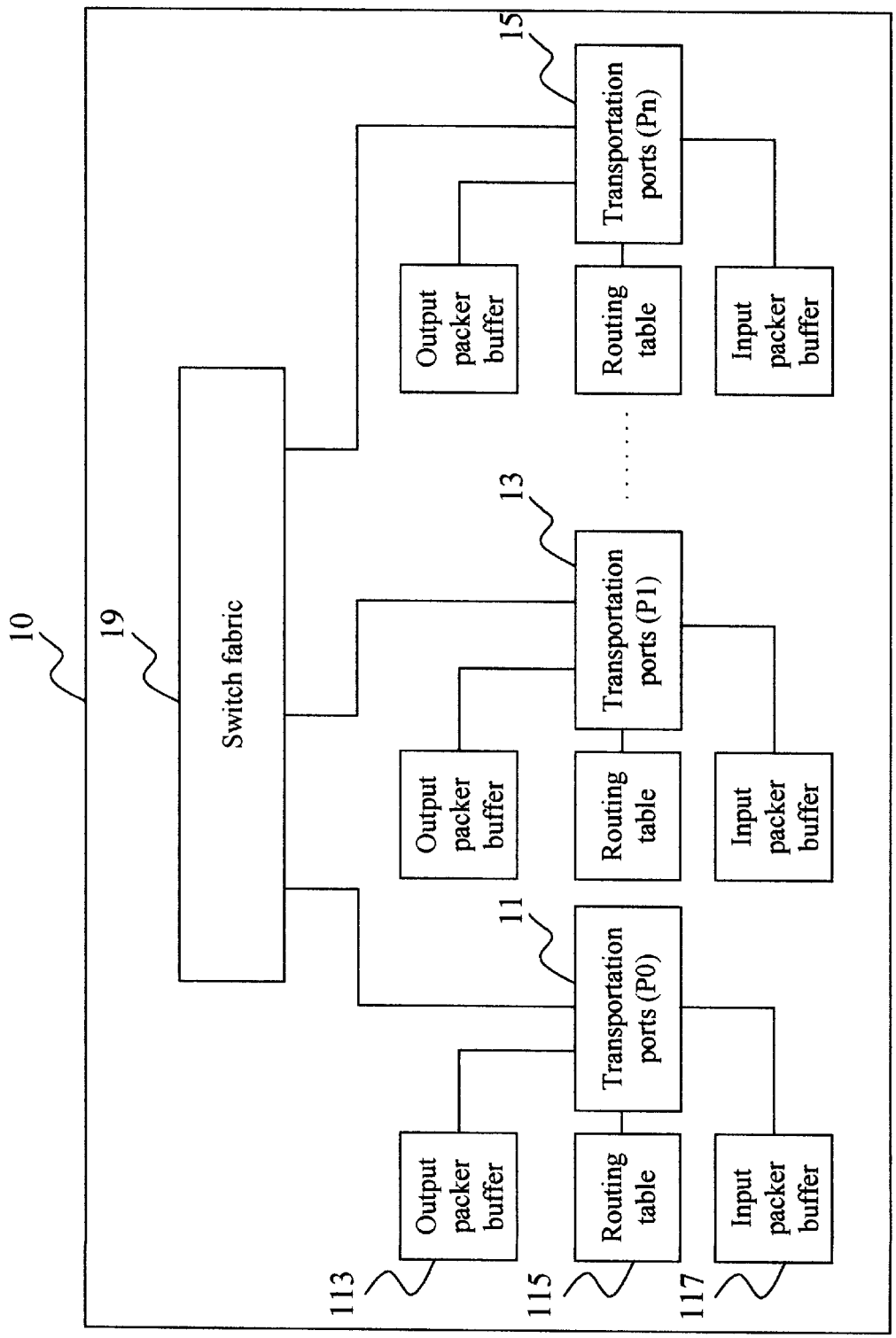
FIG. 1 is a schematic view showing a multi-port network switch of a conventional distributed structure.
Figure 2:
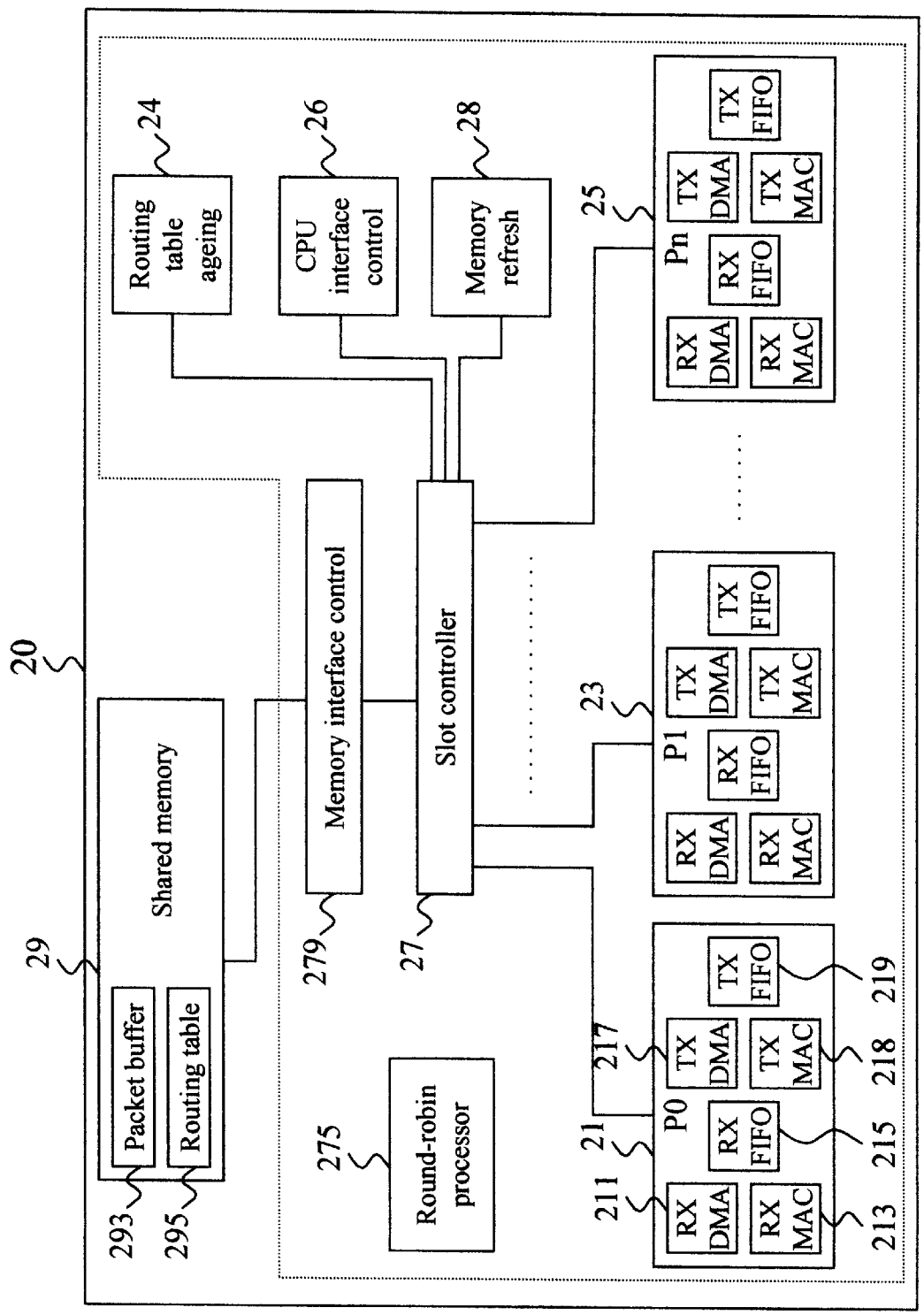
FIG. 2 is a schematic view showing a multi-port network switch of a conventional shared memory structure.
Figure 2A:
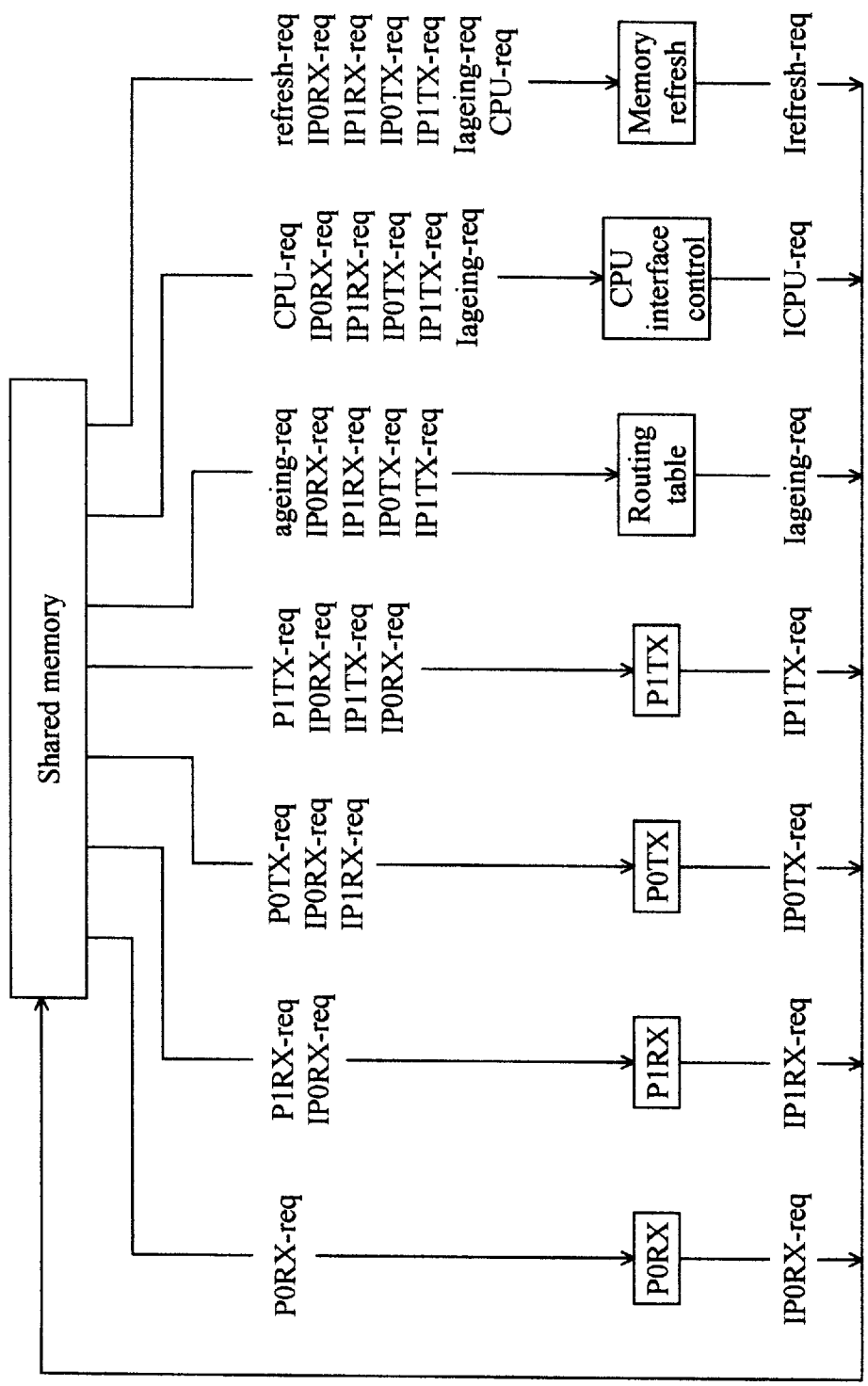
FIG. 2A is a schematic view showing arbitration operations performed by the slot controller of the switch shown in FIG. 2.
Figure 2B:
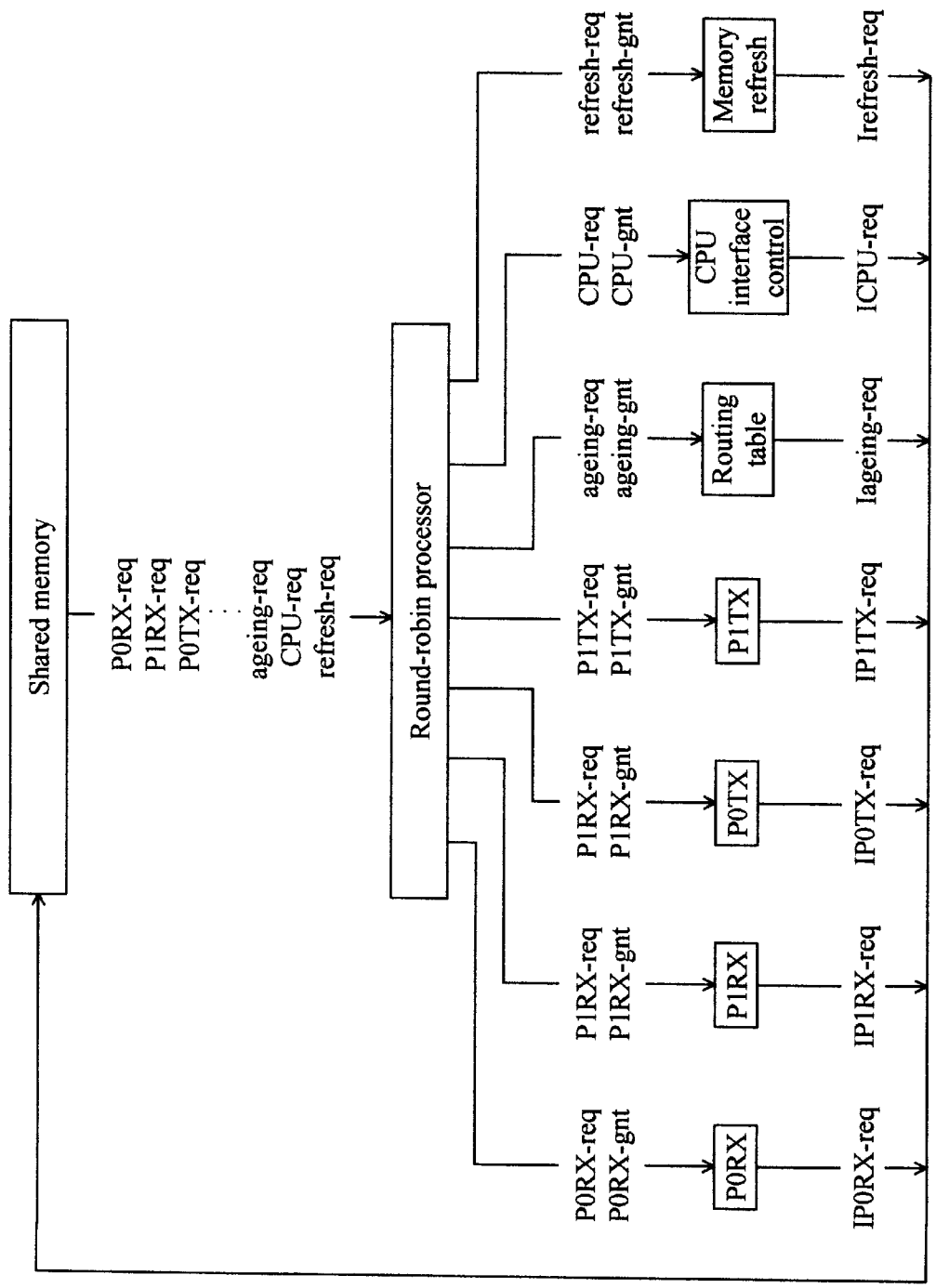
FIG. 2B is a schematic view showing fixed round-robin arbitration operations performed by the slot controller of the switch shown in FIG. 2.
Figure 3:
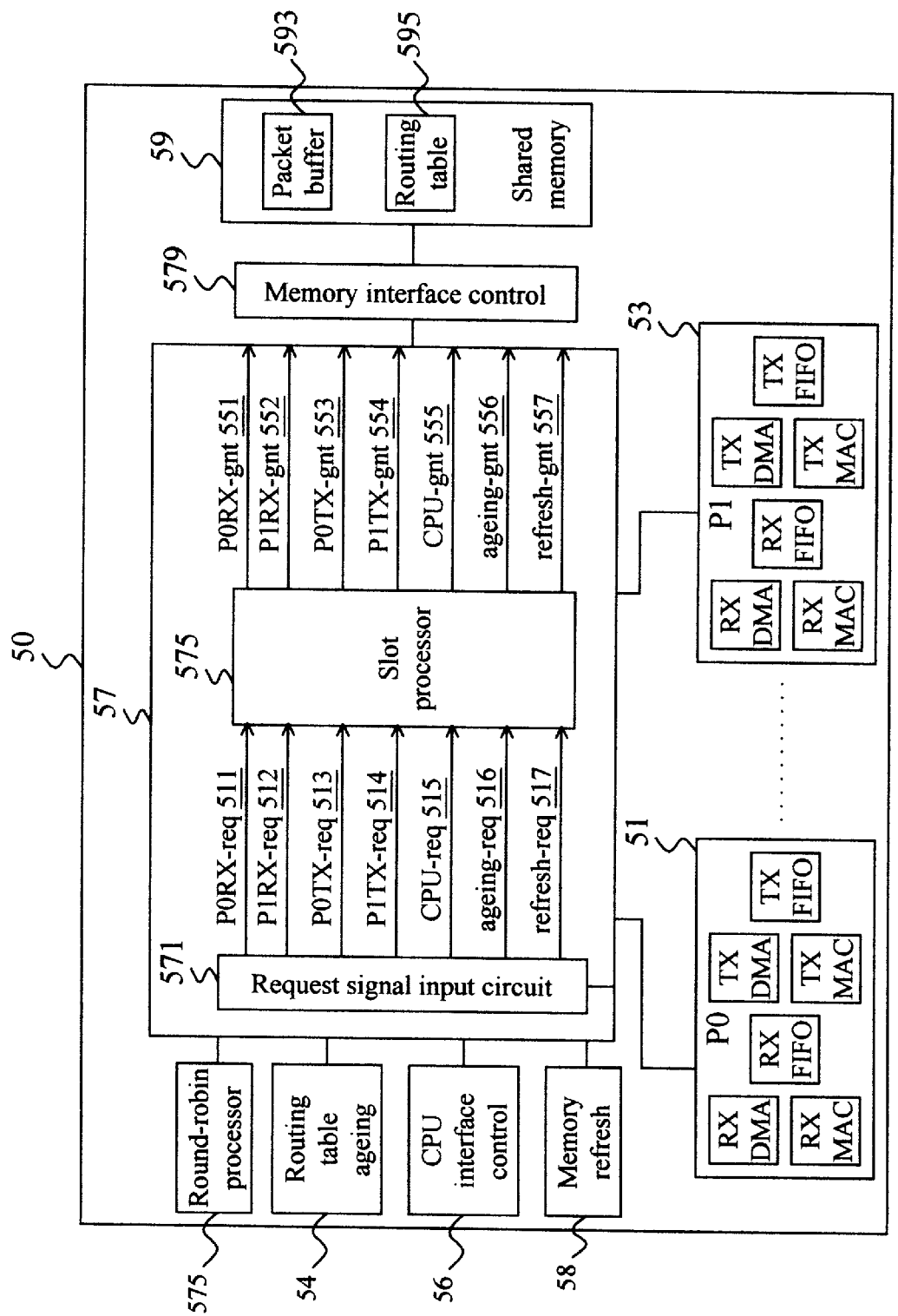
FIG. 3 is a schematic view showing an internal structure of a multi-port network switch according to a preferred embodiment of the present invention.

First referring to FIG. 3, a schematic view of a multi-port (e.g., two-port) network switch according to a preferred embodiment of the present invention is shown. As shown, the multi-port network switch 50 comprises transportation ports 51 (P0) and 53 (P1) connected to a network, a shared memory 59 containing at least a packet buffer 593 and a routing table 595, a slot controller 57 connected to the transportation ports 51 and 53 and the shared memory 59, and a memory interface control 579 connected to the shared memory 59 and the slot controller 57. The slot controller 57 comprises a request signal input circuit 571 and a slot processor 575.

The request signal input circuit 571 is coupled from the transportation ports 51 (P0) and 53 (P3) and function blocks such as a routing table ageing 54, a CPU interface control 56 and a memory refresh 58. The request signal input circuit 571 sends a P0 port receiving end request signal 511 (P0RX-req), a P1 port receiving end request signal 512 (P1RX-req), P0 port transmitting end request signal 513 (P0TX-req), P1 port transmitting end request signal 514 (P1TX-req), a CPU interface control request signal 515 (CPU-req), a routing table ageing request signal 516 (ageing-req) and a memory refresh request signal 517 (refresh-req) to the slot processor 575. The slot processor 575 converts the various request signals into state machine codes and synthesizes the codes into a logic circuit signal. Then, a P0 port receiving end grant signal 551 (P0RX-gnt), a P1 port receiving end grant signal 552 (P1RX-gnt), P0 port transmitting end grant signal 553 (P0TX-gnt), P1 port transmitting end grant signal 554 (P1TX-gnt), a CPU interface control grant signal 555 (CPU-gnt), a routing table ageing grant signal 556 (ageing-gnt) and a memory refresh grant signal 557 (refresh-gnt) are sequentially sent to the shared memory 59 through the slot controller 57 in a fixed sequence, in order to perform data transmission or operations of the respective transportation ports or function blocks.

The slot processor 575 continuously detects whether any active transportation port or function block sends an operation request signal and detects whether a predetermined maximum allowable slot time for the transportation port or function block expires. If there is no operation request signal or the maximum allowable slot time expires, the operation of the transportation port or function block is interrupted immediately and the next transportation port or function block is activated.

Figure 4:
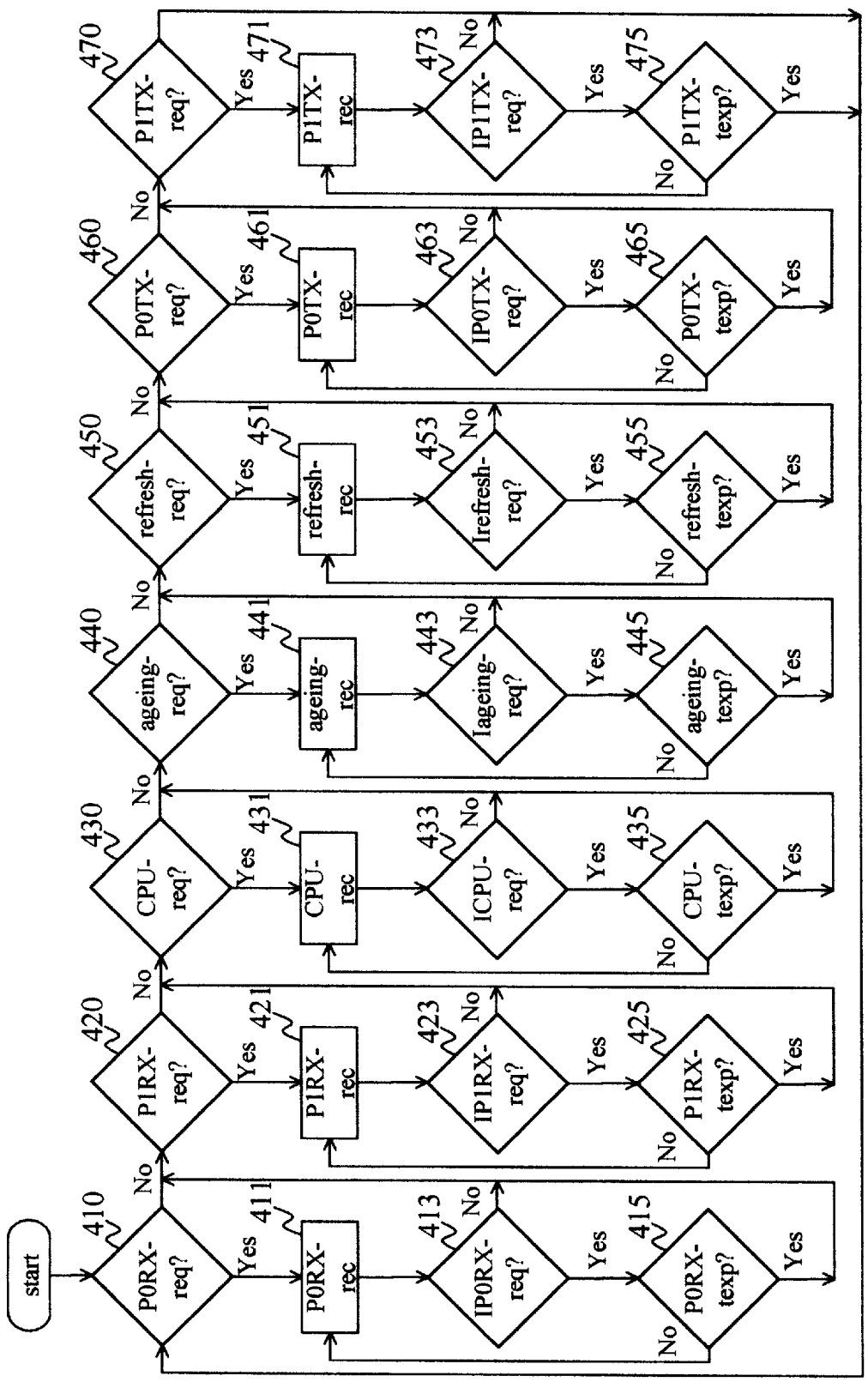
FIG. 4 is a flow chart of operations of the slot controller shown in FIG. 3.

FIG. 4 is a flow chart showing slot control of the slot controller in FIG. 3. The flow procedure comprises the following steps.

Step 410: Whether a request signal is sent from a receiving end of the transportation port P0 is detected. If yes, go to step 411. If no, go to step 420 and data transmission of a receiving end of the next transportation port P1 is allowed.

Step 411: The data from the receiving end of the transportation port P0 is received (P0RX-rec). Whether another operation request signal is sent from the receiving end of the transportation port P0 (IP0RX-req) is detected at step 413. If yes, proceed to step 415. If no, go to step 420 and data transmission of the receiving end of the next transportation port P1 is allowed.

Step 415: Whether the maximum allowable slot time of the transportation port P0 expires (P0RX-texp) is detected. If no, go to step 411 and data transmission of the receiving end of the transportation port P0 is effected. If yes, proceed to step 420 and data transmission of the receiving end of the next transportation port P1 is allowed.

Step 420: Whether an operation request signal is sent from a receiving end of the transportation port P1 is detected. If yes, go to step 421. If no, go to step 430 and a data refresh operation, such as memory start-up test, of the CPU interface control is allowed.

Steps 421–425: The data from the receiving end of the transportation port P1 is received (P1RX-rec). Whether another operation request signal is sent from the receiving end of the transportation port P1 (IP1RX-req) and whether the maximum allowable slot time expires (P1RX-texp) are detected. On the basis of the detected results, data transmission is continued, or the flow goes to step 430 and the data refresh operation of the CPU interface control is allowed.

Step 430: Whether an operation request signal is sent from the CPU is detected. If yes, go to step 431. If no, go to step 440 and a routing table data refresh operation of the routing table ageing is allowed.

Steps 431–435: The refresh operation of the CPU is effected (CPU-rec). Whether another operation request signal is sent from the transportation port of the CPU (ICPU-req) and whether the maximum allowable slot time expires (CPU-texp) are detected. On the basis of the detected results, the operation of the CPU is continued, or the flow goes to step 440 and the routing table data refresh operation of the routing table ageing is allowed.

Step 440: Whether a request signal is sent from the transportation port of the ageing is detected. If yes, go to step 441. If no, go to step 450 and a memory data refresh operation of the memory refresh is allowed.

Steps 441–445: The routing table data refresh operation of the ageing is effected (ageing-rec). Whether another operation request signal is sent from the ageing (Iageing-req) and whether the maximum allowable slot time expires (ageing-texp) are detected. On the basis of the detected results, the operation of the ageing is continued, or the flow goes to step 450 and the memory data refresh operation of the memory refresh is allowed.

Step 450: Whether a request signal is sent from the refresh is detected. If yes, go to step 451. If no, go to step 460 and data transmission of a transmitting end of the next transportation port P0 is allowed.

Steps 451–455: The memory data refresh operation of the refresh is effected (refresh-rec). Whether another operation request signal is sent from the refresh (Irefresh-req) and whether the maximum allowable slot time expires (refresh-texp) are detected. On the basis of the detected results, the operation of the refresh is continued, or the flow goes to step 460 and data transmission of the transmitting end of the next transportation port P0 is allowed.

Step 460: Whether a request signal is sent from the transmitting end of the transportation port P0 is detected. If yes, go to step 461. If no, go to step 470 and data transmission of the transmitting end of the next transportation port P1 is allowed.

Steps 461–465: The data from the transmitting end of the transportation port P0 is received (P0TX-rec). Whether another operation request signal is sent from the transmitting end of the transportation port P0 (IP0TX-req) and whether the maximum allowable slot time expires (P0TX-texp) are detected. On the basis of the detected results, data transmission of the transmitting end of the transportation port P0 is continued, or the flow goes to step 470 and data transmission of the transmitting end of the next transportation port P1 is allowed.

Step 470: Whether a request signal is sent from the transmitting end of the transportation port P1 is detected. If yes, go to step 471. If no, the flows goes back to step 410 and the next cycle starts in order to allow data transmission of the receiving end of the next transportation port P0.

Steps 471–475: The data from the transmitting end of the transportation port P1 is received (P1TX-rec). Whether the request signal from the transmitting end of the transportation port P1 is interrupted (IP1TX-req) and whether the maximum allowable slot time expires (P1TX-texp) are detected. On the basis of the detected results, data transmission of the transmitting end of the transportation port P1 is continued, or the flows goes back to step 410 and the next cycle starts in order to allow data transmission of the receiving end of the next transportation port P0.

In accordance with the present invention, the possibility of sharing a memory for each transportation port or function block is equal. Since a transportation port or function block which has a transmission overload or has completed its operation can be duly deactivated, and the next transportation port or function block can be activated immediately, the idle time of the transportation port or function block can be reduced and the packet latency can be considerably decreased, thereby reducing the necessary internal FIFOs and the cost.

Figure 5:
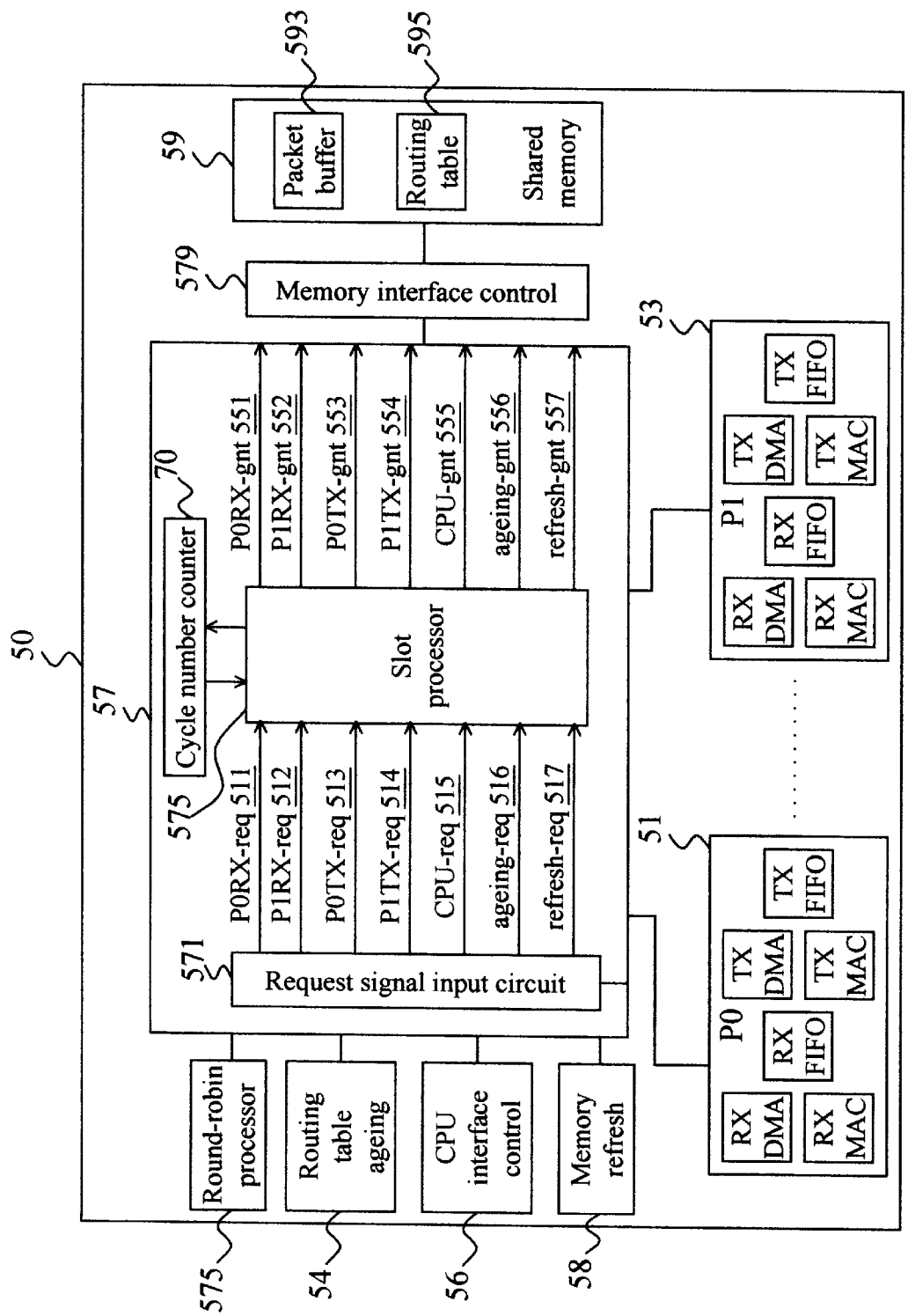
FIG. 5 is a schematic view showing an internal structure of a multi-port network switch according to another preferred embodiment of the present invention.

Further, with reference to FIGS. 5 and 6, a schematic view and a flow chart of a multi-port network switch according to another embodiment of the present invention are illustrated. As shown, the multi-port network switch 50 is additionally provided with a cycle number counter 70 connected to a slot processor 575 because access to DRAM needs more clock cycles if a shared memory 59 comprises a DRAM. In the present embodiment, function blocks of low priority such as a routing table ageing 54, a CPU interface control 56 and a memory refresh 58 can be split in different cycles. In other words, only one function is effected in each cycle so that a transportation port of high priority can be activated more frequently, thereby reducing the necessary internal FIFOs. In addition, even in the case of using DRAMs, the full line speed can be achieved.

The flow procedure of the present embodiment comprises the following steps.

Step 610: It corresponds to steps 410–415 in FIG. 4. Data from a receiving end of a transportation port P0 is received. Whether another operation request signal is sent from the receiving end of the transportation port P0 or whether the maximum allowable slot time expires is continuously detected. If the operation request signal is sent and the maximum allowable slot time does not expire, the flow proceeds to step 620.

Step 620: It corresponds to steps 420–425 in FIG. 4. Data from a receiving end of a transportation port P1 is received. Whether there is another request signal or whether the maximum allowable slot time expires is continuously detected. The flow goes to step 630, 640, 650 or 660 on the basis of the cycle number.

Steps 630–650: They correspond to steps 430–435, steps 440–445 and steps 450–455 in FIG. 4, respectively. Next, the flow goes to step 660.

Step 660: It corresponds to steps 460–465 in FIG. 4. Data from a transmitting end of the transportation port P0 is received. Whether another operation request signal is sent from the transmitting end of the transportation port P0 or whether the maximum allowable slot time expires is continuously detected. If the operation request signal is sent and the maximum allowable slot time does not expire, the flow proceeds to step 670.

Step 670: It corresponds to steps 470–475 in FIG. 4. Data from a transmitting end of a transportation port P1 is received. Whether there is another request signal or whether the maximum allowable slot time expires is continuously detected. If there is no request signal and the maximum allowable slot time expires, it means that the operation is completed in the current cycle. The flow then goes to step 680 for the next operation.

Step 680: The cycle number counter increments by one, and the flow returns to step 610 for the next cycle.

According to the present embodiment of the present invention, since the transportation ports of low priority are split in four cycles and only one function is performed in each cycle, the duration of the cycle is considerably shortened and the packet latency and internal FIFOs are reduced. Therefore, the efficiency of the network bandwidth is elevated and the cost is decreased while full line speed can be achieved even in the case of using DRAMs.

While the present invention has been described in conjunction with preferred embodiments thereof, it is evident that many alternatives, modifications and variations will be apparent to those skilled in the art. For example, the multi-port network switch is not limited to a two-port network switch, and the memory can be a SRAM instead. Accordingly, it is intended to embrace all such alternatives, modifications and variations that fall within the spirit and scope thereof as set forth in the appended claims.

What is claimed is:

1. In a slot controller of a network switch, a slot control method with a fixed sequence and a dynamic slot effect, comprising the steps of:

controlling and sequentially allowing, in a fixed round-robin manner, a plurality of transportation ports and function blocks connected to the slot controller to perform predetermined operations;

continuously detecting whether active transportation port or function block among the plurality of transportation ports and function blocks sends an operation request signal; and immediately allowing the next transportation port or function block to operate if there is no operation request signal, thereby reducing the packet latency.

2. The slot control method according to claim 1, further comprising the step of setting a maximum allowable slot time for each of the transportation ports and function blocks, wherein the active transportation port or function block is deactivated if the operation time thereof exceeds the maximum allowable slot time thereof and operation of the next transportation port or block is allowed immediately.

3. The slot control method according to claim 1, wherein function blocks having low priority among the plurality of function blocks are split in different cycles on the basis of the functions thereof so that the functions can be carried out in the corresponding cycles to speed up the overall operations of the transportation ports.

4. The slot control method according to claim 3, wherein the function blocks comprise a routing table ageing, a CPU interface control and a memory refresh.

5. The slot control method according to claim 2, wherein the maximum allowable slot time depends on characteristics of the respective transportation ports and the function blocks.

6. In a slot controller of a network switch, a slot control method with a fixed sequence and a dynamic slot effect, comprising the steps of:

controlling and sequentially allowing, in a fixed round-robin manner, a plurality of transportation ports and function blocks connected to the slot controller to perform predetermined operations; and splitting function blocks having low priority among the plurality of function blocks in different cycles on the basis of the functions thereof so that the functions can be carried out in the corresponding cycles to speed up the overall operations of the transportation ports.

7. The slot control method according to claim 6, wherein the function blocks comprise a routing table ageing, a CPU interface control and a memory refresh.

8. The slot control method according to claim 6, wherein the slot controller continuously detects whether active transportation port or function block among the plurality of transportation ports and function blocks sends an operation request signal, and immediately allows the next transportation port or function block to operate if there is no operation request signal, thereby reducing the packet latency.

9. The slot control method according to claim 6, further comprising the step of setting a maximum allowable slot time for each of the transportation ports and function blocks, wherein the active transportation port or function block is deactivated if the operation time thereof exceeds the maximum allowable slot time thereof and operation of the next transportation port or block is allowed immediately.

10. The slot control method according to claim 9, wherein the maximum allowable slot time depends on characteristics of the respective transportation ports and the function blocks.

11. The slot control method according to claim 8, further comprising the step of setting a maximum allowable slot time for each of the transportation ports and function blocks, wherein the active transportation port or function block is deactivated if the operation time thereof exceeds the maximum allowable slot time thereof and operation of the next transportation port or block is allowed immediately.

12. A multi-port network switch with a dynamic slot effect, comprising:

a plurality of transportation ports connected to a network interface;

at least a function block;

a shared memory including at least a packet buffer and a routing table; and a slot controller connected to the plurality of transportation ports and the function block and coupled with the shared memory through a memory interface control;

the switch being characterized in that the slot controller further comprises a slot processor for continuously detecting whether active transportation port or function block among the plurality of transportation ports and the function block sends an operation request signal whereby a next said transportation port or function block is immediately operated in the absence of an operation request signal.

13. The multi-port network switch according to claim 12, wherein the slot controller further comprises a request signal input circuit, connected to the plurality of transportation ports and the function block, for generating an operation request signal corresponding to each of the transportation ports and function block and transmitting the operation request signal to the slot processor.

14. The multi-port network switch according to claim 12, wherein the function block is a routing table ageing.

15. The multi-port network switch according to claim 12, wherein the function block is a CPU interface control.

16. The multi-port network switch according to claim 12, wherein the function block is a memory refresh.

17. The multi-port network switch according to claim 12, further comprising a cycle number counter connected to the slot processor.

18. The multi-port network switch according to claim 12, wherein the shared memory is a DRAM.

19. The multi-port network switch according to claim 12, wherein the shared memory is a SRAM.

* * * * *